Figure 1:
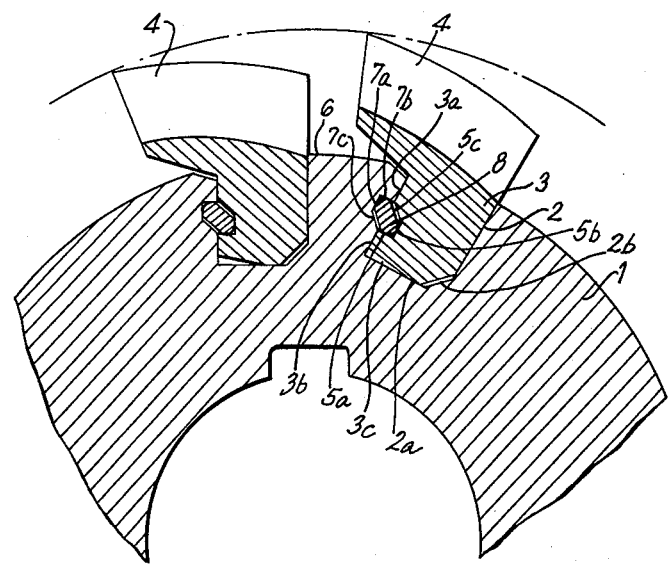

Dec. 29, 1964  O. KRUSE  3,162,928
MACHINE TOOL CUTTER AND PROCESS FOR ASSEMBLING THE SAME
Filed Oct. 8, 1962

INVENTOR.
Otto Kruse
BY
Michael S. Striker
ATTY

United States Patent Office 3,162,928
Patented Dec. 29, 1964

3,162,928
MACHINE TOOL CUTTER AND PROCESS FOR ASSEMBLING THE SAME
Otto Kruse, Schwarzenbek, Germany, assignor to Firma Wilhelm Fette, Schwarzenbek, Germany
Filed Oct. 8, 1962, Ser. No. 228,826
Claims priority, application Germany, Oct. 12, 1961, F 35,122
5 Claims. (Cl. 29—105)

The present invention relates to machine tool cutters.

More particularly, the present invention relates to cutters of the type which are used, for example, on milling machines or the present invention is also applicable to hobs used in the manufacture of gears, worms, or worm-wheels.

It is known in machine tool cutters of this type to provide the cutters with grooved cutter bodies which receive the cutter blades in the grooves. The great advantage of this type of construction is that it is necessary to make only the cutter blades of a high quality material while the cutter body itself can be made of a less expensive material, and of course it is always possible to replace a damaged cutter blade with a new cutter blade so that the life of the tool is extended with such a construction.

However, certain difficulties arise in the manner in which the cutting blades are assembled with and joined to the cutter bodies. With many known cutters of this type there are serious limitations as to the size of the cut which may be taken with the cutter as well as with respect to the hardness of the material which may be cut because if the load is too great the blades will vibrate undesirably leading to breakage and also to inaccuracy in the machining operations.

Furthermore, in order to provide high quality cutters of this type it is necessary to manufacture the cutting blades as well as the cutter body with an extremely high degree of precision, so that as a result such cutters do not lend themselves to mass production.

Moreover, considerable difficulty has been encountered in the manner in which the cutting blades are fastened to the cutter body, and many of the known constructions either break frequently or do not provide a secure, vibration-free mounting for the cutter blades in the cutter body.

It is accordingly a primary object of the present invention to provide a machine tool cutter of the type discussed above but which will be capable of being very accurately manufactured by mass production methods.

It is also an object of the present invention to provide a machine tool cutter of the above type which connects the blades to the cutter body in such a way that the size of the cut which can be made in one operation with the cutter of the invention is much greater than can be made with comparable known cutters, without any danger of breakage or undesirable vibrations.

It is still another object of the present invention to provide for a machine tool cutter of the above type a secure connection which automatically becomes tighter as forces which act on the blades tend to pull the latter out of the grooves.

It is still another object of the present invention to provide for a cutter of the above type a process for assembling the blades with the cutter in such a way that it will not be possible for the cutter body to become so deformed that it will be next to impossible to assemble all of the blades with the cutter.

It is furthermore an object of the present invention to provide a cutter which can accomplish the above objects and which at the same time is relatively inexpensive and very rugged and reliable in its operation.

With the above objects in view, the invention includes a machine tool cutter which has a cutter body formed at its exterior with a plurality of axial blade slots and a plurality of cutter blades which respectively have legs which are respectively located in the slots of the cutter body. In accordance with the present invention these legs have free end portions which have a snug, sliding fit in the slots, respectively, and, next to the end portions, base portions which have a press fit in the slots. In addition, as described below, the cutter blade legs and cutter body are formed with grooves which define cavities which receive keys for further securing the cutter blades to the cutter body.

The process for assembling the cutting blades with the cutter body, according to the present invention, requires that first only the free end portions of the blade legs, which have a snug sliding fit in the slots, be placed respectively in the slots, and, only after all the slots are respectively occupied by the free end portions of the blades, are these blades driven into the slots to insert the base portions, which have a press fit in the slots, into the latter.

Figure 2:
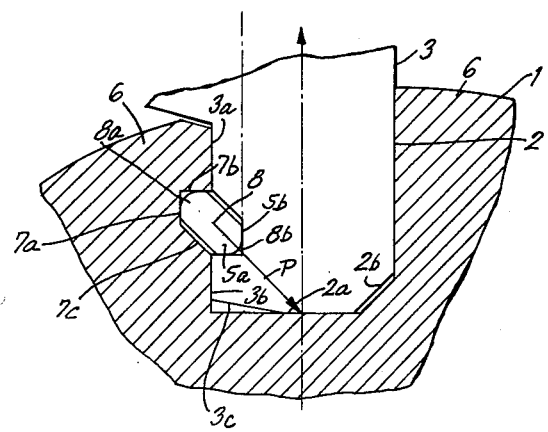

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary sectional view illustrating the connection between the cutting blades and the cutter body, the plane of the section of FIG. 1 being normal to the central axis of rotation of the cutter, and FIG. 1 showing only a pair of cutting blades for the sake of simplicity; and FIG. 2 is a view similar to FIG. 1 showing on an enlarged scale the connection between a cutter blade and the cutter body.

It is to be understood that while only a pair of blades and slots are shown in FIG. 1, the cutter body 1 is actually formed with slots distributed all the way around its axis and respectively receiving blades in the manner shown in FIG. 1.

As may be seen from the drawings, the cutter body 1 is formed at its periphery with a plurality of axially extending blade slots 2 which are of substantially rectangular cross section. The several cutting blades 4 are respectively provided with legs 3 which are respectively received in the slots 2, and the free ends of the legs 3 engage the base surfaces 2a of the slots 2 respectively.

As may be seen from FIG. 1, the cutting tool illustrated therein rotates during operation in a counterclockwise direction, as viewed in FIG. 1, and the left faces of the legs 3 of the blades which are shown in FIG. 1 thus form front or leading faces which lead, during use of the cutter, the rear or trailing right faces of the legs 3, as viewed in FIG. 1, and the slots 2 are each defined in part by corresponding leading and trailing (or front and rear) faces which respectively engage the leading and trailing faces of the legs 3. It is to be noted that the leading and trailing side faces of each leg 3 are parallel to each other as are the leading and trailing faces of any one slot.

Each leg 3 is formed at its leading or front face with an axial substantially V-shaped groove defined by the surfaces 5a and 5b, and the leading or front faces of the slots 2 are also formed with axial substantially V-shaped grooves defined by the faces 7a and 7b. The faces 7a and 5b extend substantially radially with respect to the axis of the cutter while the faces 7b and 5a are respectively perpendicular to the faces 7a and 5b. Moreover, it will be seen that the substantially V-shaped grooves at the contacting front or leading faces of each blade and body slot communicate with each other to define an elongated axial cavity adapted to receive a key 8. All of the above grooves extend along the entire length of the blades and cutter body.

The leg 3 of each blade 4 has a free end portion 3b on one side of the groove 5a, 5b, and a base portion 3a on the other side of the groove 5a, 5b, the portion 3b engaging the base 2a of the slot 2, as indicated in the drawing. In accordance with the present invention the thickness of the free end portion 3b of each leg 3 is such that it has a snug sliding fit in the slot 2, while the thickness of the base portion 3a of each leg 3 is somewhat greater than the thickness of the portion 3b and has a press fit in the slot 2.

In accordance with the present invention, when the blades 4 are assembled with the body 1, only the portions 3b of the legs 3 are initially placed in all of the slots 2, and it is not until all of the legs 3 have been placed at their portions 3b respectively in the slots 2 that the legs 3 are driven further into the slots so as to displace their portions 3a into the slots. Therefore, according to the process of assembly of the present invention the thicker portions which have a press fit in the slots are not driven into the latter until the slots are all occupied by the free end portions which have only a snug, sliding fit in the slots, and when the portions 3a are displaced into the slots, this displacement is continued until the legs 3 engage the bases 2a of the slots 2.

As may be seen from FIG. 1 the portion 6 of the body 1 between a pair of successive slots 2 is not very thick. As a consequence, if the legs 3 were moved successively all the way into the slots so that the portions 3a were located in some slots before any of the legs were placed in the other slots, the result would be that the successive wall portions 6 of the body 1 would be slightly deformed, and the extent of deformation would be cumulative to such an extent that when the last few blades were to be placed in the last few slots, the widths of these slots would be diminished to such an extent that it would not be possible to introduce the blade legs into these slots. With the process of the invention, however, since the portions 3b of all of the legs are initially located in all of the slots, respectively, the extent to which the walls 6 can become deformed is greatly reduced and thus, it is possible to drive all of the blades all the way into the slots. It is preferred, with the process of the invention, to use for the driving of the blades 4 into the slots 2 a known device capable of simultaneously advancing all of the blades 4 simultaneously into the slots 2.

The press fit of the legs 3, at their portions 3a, in the slots 2 provides a rigid connection of the blades to the slots, and while not absolutely essential, it is preferred to increase the security of the connection by the use of the above-described V-shaped grooves 5a, 5b and 7a, 7b which define cavities which receive the keys 8, respectively.

Since the grooves 5a, 5b are nearer to the axis of the cutter than the grooves 7a, 7b the keys 8 are inclined in the manner shown in the drawing. Moreover, the keys 8 have substantially V-shaped portions respectively received in the V-shaped grooves, and the edges 8a and 8b of the V-shaped portions of the key 8 are rounded so that the key does not extend into the corners of the V-shaped grooves and instead has a source pressing engagement with the surfaces 5a, 5b, 7a, 7b along the entire lengths thereof.

Because of the above-described arrangement of the key 8, this key acts as a lever which tends to turn about its portion in the groove 7a, 7b as the blade is pulled in the direction of the arrow shown in FIG. 2, and because of this lever action resulting from a tendency of the blades to be pulled out of the slots, the keys 8 exert, in the direction of arrow P shown in FIG. 2, an inwardly directed force opposing the outwardly directed force to an increasing extent as the outwardly directed forces increase, so that in this way the keys 8 act to hold the blades with increasing force in the slots as the force tending to pull the blades out increases.

In accordance with further features of the invention the trailing inner corner 2b of each slot 2 is bevelled and the leg 3 has a corresponding bevelled configuration mating therewith, while at its leading or front outer corner each leg 3 is provided with a bevelled surface 3c spaced from the inner leading corner of the slot 2. As a result of these features the legs fit securely into the slots all the way up to the bases 2a thereof even if the parts are manufacturing according to mass production methods.

In order to form the V-shaped grooves described above, it is for practical purposes necessary to provide the body 1 with the surfaces 7c at the front faces of the slots 2 and the legs 3 with the surfaces 5c at the front faces of the legs 3, and it will be seen that these surfaces 5c and 7c together with the V-shaped grooves form cavities in which the keys 8 can be received with only a slight clearance so that there is a minimum wastage of material.

It will be understood that each of the elements described above, or two or more together, may also find a useful application in other types of cutters differing from the types described above.

While the invention has been illustrated and described as embodied in machine tool cutters, it is not intended to be limited to the details shown, since various applications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for assembling cutting blades of a machine tool cutter with a cutter body formed with slots for respectively receiving the legs of the cutting blades, said legs respectively having free end portions which have a snug, sliding fit in said slots and, next to said free end portions, base portions which have a press fit in said slots, comprising the steps of first inserting only the free end portions of said blade legs into all of said slots, respectively, so that all of said slots are only partly occupied, with a snug sliding fit, by said blade legs, respectively; and, only after all of free end portions of the blade legs have been placed into all of said slots, driving the base portions of said blade legs into said slots, respectively, for rigidly fixing said blades to said cutter body.

2. In a process for assembling cutting blades of a machine tool cutter with a cutter body formed with slots for respectively receiving the legs of the cutting blades, said legs respectively having free end portions which have a snug, sliding fit in said slots and, next to said free end portions, base portions which have a press fit in said slots, the steps of first inserting only the free end portions of said blade legs into all of said slots, respectively, so that all of said slots are only partly occupied, with a snug sliding fit, by said blade legs, respectively; and, only after all of the blades have been placed at said free end portions of said legs thereof in all of said slots, simultaneously driving the base portions of said legs of said blades into said slots for rigidly fixing said blades to said cutter body.

3. A machine tool cutter comprising, in combination, a cutter body formed at its exterior with a plurality of axial slots and a plurality of cutting blades respectively having legs located in said slots, said legs of said cutting blades respectively having free end portions which have a snug, sliding fit in said slots and, next to said end portions, base portions which have a press fit in said slots, said blades having at said legs thereof, respectively, front faces which lead in the direction of rotation of the cutter and rear faces which trail in the direction of rotation of the cutter, and said cutter body respectively having front slot faces engaging said front faces of said blade legs and rear slot faces respectively engaging said rear faces of said blade legs, said cutter body being formed at said front slot faces thereof with axial grooves of substantially V-shaped configuration and said blade legs being respectively formed at said front faces thereof with axial grooves also of substantially V-shaped configuration and the V-shaped grooves of said cutter body respectively communicating with the V-shaped grooves of said blade legs to form axially extending cavities therewith, said V-shaped grooves of said blade legs being located closer to the central axis of rotation of the cutter body than the V-shaped grooves formed in the front slot faces of said cutter body; and a plurality of keys located in said cavities and pressing against the faces of said V-shaped grooves for further securing said cutting blades in the slots of said cutter body, said keys respectively having substantially V-shaped portions received in said V-shaped grooves of said body and blades and the edges of said V-shaped portions of said keys being rounded so that the keys do not extend into the corners of said V-shaped grooves and press securely against the faces of said V-shaped grooves.

4. A machine tool cutter comprising, in combination, a cutter body formed at its exterior with a plurality of axial slots and a plurality of cutting blades respectively having legs located in said slots, said legs of said cutting blades respectively having free end portions which have a snug, sliding fit in said slots and, next to said free end portions, base portions which have a press fit in said slots, said blades having at said legs thereof, respectively, front faces which lead in the direction of rotation of the cutter and rear faces which trail in the direction of rotation of the cutter, and said cutter body respectively having front slot faces engaging said front faces of said blade legs and rear slot faces respectively engaging said rear faces of said blade legs, said cutter body being formed at said front slot faces thereof with axial grooves of substantially V-shaped configuration and said blade legs being respectively formed at said front faces thereof with axial grooves also of substantially V-shaped configuration and the V-shaped grooves of said cutter body respectively communicating with the V-shaped grooves of said blade legs to form axially extending cavities therewith; and a plurality of keys located in said cavities and pressing against the faces of said V-shaped grooves for further securing said cutting blades in the slots of said cutter body, the V-shaped grooves of said blade legs being located closer to the central axis of rotation of the cutter body than the V-shaped grooves formed in said front slot faces of said cutter body, and said keys being inclined with the portions thereof in said V-shaped grooves of said blade legs located closer to the axis of the cutter than the portions of said keys which are respectively located in the V-shaped grooves of said body, and each of said V-shaped grooves being defined by one surface which extends substantially radially with respect to the axis of the cutter body and a second surface which is perpendicular to said one surface and said keys having rounded ends so as to engage said surfaces substantially with a line contact.

5. A machine tool cutter comprising, in combination, a cutter body formed at its exterior with a plurality of axial slots and a plurality of cutting blades respectively having legs located in said slots, said legs of said cutting blades respectively having free end portions which have a snug, sliding fit in said slots and, next to said end portions, base portions which have a press fit in said slots, said blade legs respectively having opposed side faces which respectively engage side faces of said body which define said slots therein, and all of the side faces of a cooperating blade leg and slot being parallel to each other.

References Cited by the Examiner
UNITED STATES PATENTS

| | | | |
|---|---|---|---|
| 637,495 | 11/99 | Arnold. | |
| 1,432,579 | 10/22 | Vauclain. | |
| 1,621,226 | 3/27 | Welter | 76—101 |
| 2,172,545 | 9/39 | Praeg | 76—101 |
| 2,173,848 | 9/39 | Kraus | 29—105 |
| 2,234,965 | 3/41 | De Vlieg | 29—105 |
| 2,264,299 | 12/41 | Crosby | 29—105 |
| 2,706,848 | 4/55 | Riley | 29—105 |
| 2,932,080 | 4/60 | Schmidt | 29—105.1 |

FOREIGN PATENTS

| | | |
|---|---|---|
| 726,997 | 3/55 | Great Britain. |
| 817,024 | 7/59 | Great Britain. |

WILLIAM W. DYER, *Primary Examiner.*
LEON PEAR, *Examiner.*